W. T. BENTZ & W. McKEE.
GATE.
APPLICATION FILED DEC. 6, 1913.
1,128,839.
Patented Feb. 16, 1915.
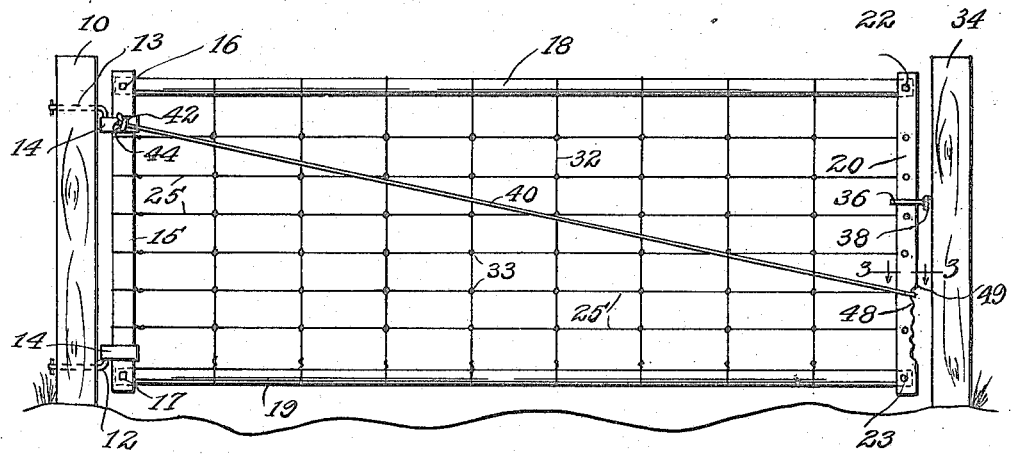
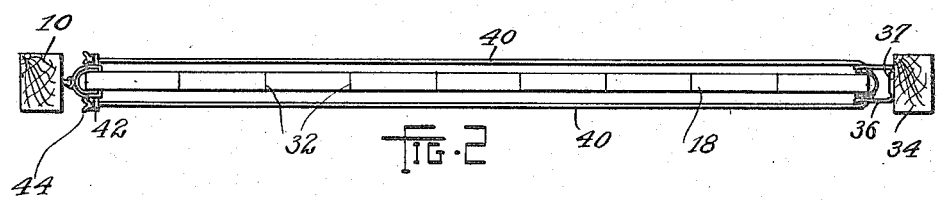
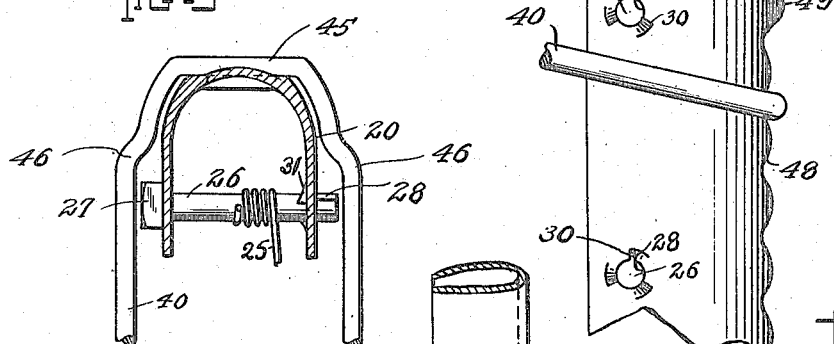
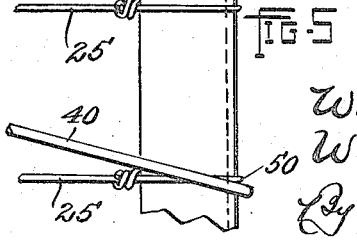

UNITED STATES PATENT OFFICE.

WILLIAM T. BENTZ AND WILLIS McKEE, OF ELYRIA, OHIO, ASSIGNORS TO THE ELYRIA IRON & STEEL COMPANY, OF ELYRIA, OHIO, A CORPORATION OF OHIO.

GATE.

1,128,839.  Specification of Letters Patent.  Patented Feb. 16, 1915.

Application filed December 6, 1913. Serial No. 804,965.

*To all whom it may concern:*

Be it known that we, WILLIAM T. BENTZ and WILLIS McKEE, citizens of the United States, residing at Elyria, in the county of Lorain and State of Ohio, have invented a certain new and useful Improvement in Gates, of which the following is a full, clear, and exact description, reference being had to the accompanying drawings.

This invention relates to that type of farm gates which are adapted to be raised at the free end so that the gate may swing clear of hummocks, stones, snow, or other obstacles, and which may be raised while in closed position allowing small stock or poultry to pass beneath the gate, which will still turn the larger stock.

The object of the present invention is to provide a gate of this type which shall be simple and cheap to construct, strong and durable in use, and very conveniently operated.

The invention is hereinafter more fully described and the essential characteristics set forth in the claims.

Figure 1 is a side elevation of our gate; Fig. 2 is a plan of the same; Fig. 3 is a horizontal detail of the free stile of the gate on an enlarged scale, taken on the line 3—3 of Fig. 1; Fig. 4 is a detail on the same scale of a portion of this same stile of the gate; Fig. 5 is a detail view of a modified stile at the free end of the gate.

Referring to the parts by reference numerals: 10 designates a gate post which is shown as a rectangular wooden post carrying two hinge hooks 12 and 13 engaging the straps 14 which are secured to one stile 15 of the gate and have eyes for the hooks. The stile 15 is preferably made of a U-shaped metal bar. Within the sides of the U, adjacent the top and bottom of the same, are pivoted, at 16 and 17, the ends of the upper and lower struts 18 and 19 respectively. At the forward end of these struts is a similar stile 20 between the sides of which the ends of the struts 18 and 19 extend and to which they are pivoted at 22 and 23. Connected to the stiles and the struts are suitable crossing wires, as the horizontal wires 25, and the vertical wires 32 knotted at their intersections 33. The wires 25 are shown as extending around the stile 15 and permanently attached thereto, while their opposite ends may be secured to members carried by the stile 20 and adapted to tighten these wires. These members as shown in Figs. 1, 3 and 4, comprise bolts 26 each having a suitable head 27 and extending through the sides of the stile 20 and each having a lug 28 pressed on the end of the bolt after the bolt is placed in position. The lugs are adapted to engage rigid teeth 30 formed by pressing the adjacent portion 31 of the stile inwardly. As these bolts are turned to tighten the wire, the sides of the members spring inwardly allowing the lug 28 to pass up onto each tooth 31 and engage the next tooth, preventing its return. At the free end of the gate is provided another suitable gate post 34 which carries any suitable latch, for example the hinged latch 36 comprising a U-shaped member suitably mounted in a staple 37 driven into the post and having an eye surrounding the connecting portion of the latch. Such latch is adapted to be turned up, allowing the gate to swing to either side or it may be dropped to a horizontal position where it engages each side of the stile 20. It is prevented from dropping below the horizontal position by a lug 38 engaging the side of the post.

It will be seen from the construction described, that the stile 20 may be readily moved upwardly, the struts 18 and 19 swinging on their pivots, which allows the lower stile to clear obstructions at either side of the gate. To hold the gate in this raised position while swinging it, or to maintain it raised, allowing poultry and small stock to pass beneath the gate while turning the larger stock, we provide a bail 40. The free ends of this bail pass through eye-bolts 42 which are pivotally secured to the stile 15, preferably passing through the upper hinge strap 14, to provide additional strength.

The ends of the bail may be suitably threaded and thumb screws 44 secured on the ends to adjust the length of the bail. At the forward end the bail has a straight connecting portion 45, at either side of which the bail substantially conforms to the shape of the stile 20 for a considerable distance, and then again bends outwardly at 46 allowing the sides to clear the ends of the bolts 26. The flattened portion 45 of the bail normally engages one of a number of notches 48 pressed into the stile 20. This construction enables the bail to support the free stile in an elevated position. The notches prevent the end of the bail sliding relatively upwardly on the stile except when the end of the gate is raised and the bail is manually moved upwardly. Above the upper notch 48 is provided a projection 49 which is larger than the projections between the other notches, to provide a suitable stop for the bail when the gate is lowered to its normally horizontal position.

When the gate is raised, the bail slides downwardly by gravity from one notch to another, and engages the lowest notch into which it slips, and prevents the free end of the gate moving downwardly again to normal position until it is manually released. It will be seen that the gate may be raised to allow the bail to engage any of these notches enabling the height of the gate to be adjusted so that the space beneath the gate may be so regulated that only poultry, for example, may be allowed to pass under, while stock, such as hogs or sheep, may be turned, or the gate may be farther raised to allow this smaller stock just mentioned, to pass beneath the gate while still turning horses, cattle, etc.

In the modification shown in Fig. 5, the ends of the wires 25 are secured around the stile 20, which is not provided with notches as in the form just described, but the bail 40 is allowed to engage the portions of the wires 25 at 50 where they pass around the stile, thus obviating the necessity of providing other notches in the stile—the loops of the wires constituting the projections and the spaces between them the notches referred to. This form may be adopted where a cheaper gate is required and where it is not necessary to carefully adjust the height of the gate from the ground.

Having thus described our invention, what we claim is:

1. In a gate, the combination of a pair of stiles and a pair of struts pivotally connected together, at least one of the stiles being substantially U-shaped in cross section, bolts mounted in the sides of such U-shaped stiles, wires anchored at one end to said bolts and at their other ends carried by the other stile, projections on the various bolts, and ratchet teeth pressed from the sides of said U-shaped stile and adapted to coact with the projections on the bolts.

2. In a gate, the combination of a hinged stile, a free stile, both U-shaped in cross section and having their open sides facing each other, struts extending into the openings of the stiles and pivoted thereto, a bail carried by one of the stiles and looping around the other stile, the last-mentioned stile having projections with which the bail coacts, wires anchored at one end to one of the stiles and carried by bolts in through the sides of the U portion of the other stile, said wires extending into the opening of the stile and being anchored to the bolts, and ratchet means formed in the side of the stile for locking said bolts in desired position, whereby the wires may be properly tensioned.

3. A gate comprising a hinged stile and a free stile each U-shaped in cross section, a pair of struts pivotally connected at their ends to the respective stiles, the free stile having its outer edge corrugated, a bail looping around the free stile at the corrugations and having its ends held adjustably to the hinged stile, and wires connected to the stiles.

4. A gate comprising a hinged stile and a free stile each U-shaped in cross section, a pair of struts pivotally connected at their ends to the respective stiles, projections carried by the hinged stile and provided with openings, a bail looping around the free stile and having its ends extending through said openings, means on the ends of the bail abutting said projections for adjusting the length of the bail, and wires connected to the stiles.

5. In a gate, the combination of a pair of struts, a pair of stiles, one of which is substantially U-shaped in cross section and is open toward the other stile, wires secured to said other stile extending into the opening of said U-shaped stile, bolts to which the wires are attached, each bolt having a projection at one end, ratchet members pressed from the side of said U-shaped stile adjacent the bolt hole coacting with said projections whereby the bolt may be rotated and anchored for adjusting the wires.

6. In a gate, the combination of a pair of stiles, struts pivotally connected therewith, a bail extending from one stile around the other and back to the first stile, eyes pivotally carried by said first mentioned stile through which the ends of the bail extend, said ends of the bail being threaded, thumb nuts on said threaded portions engaging the eyes, and a projection on the second named stile for engaging the bail.

In testimony whereof, we hereunto affix our signatures in the presence of two witnesses.

WILLIAM T. BENTZ.
WILLIS McKEE.

Witnesses:
L. A. OBITTS,
L. J. BOOTHROYD.